O. HOFFMANN.
BALL BEARING WITH SEVERAL ROWS OF BALLS.
APPLICATION FILED MAY 10, 1913.
1,105,433. Patented July 28, 1914.
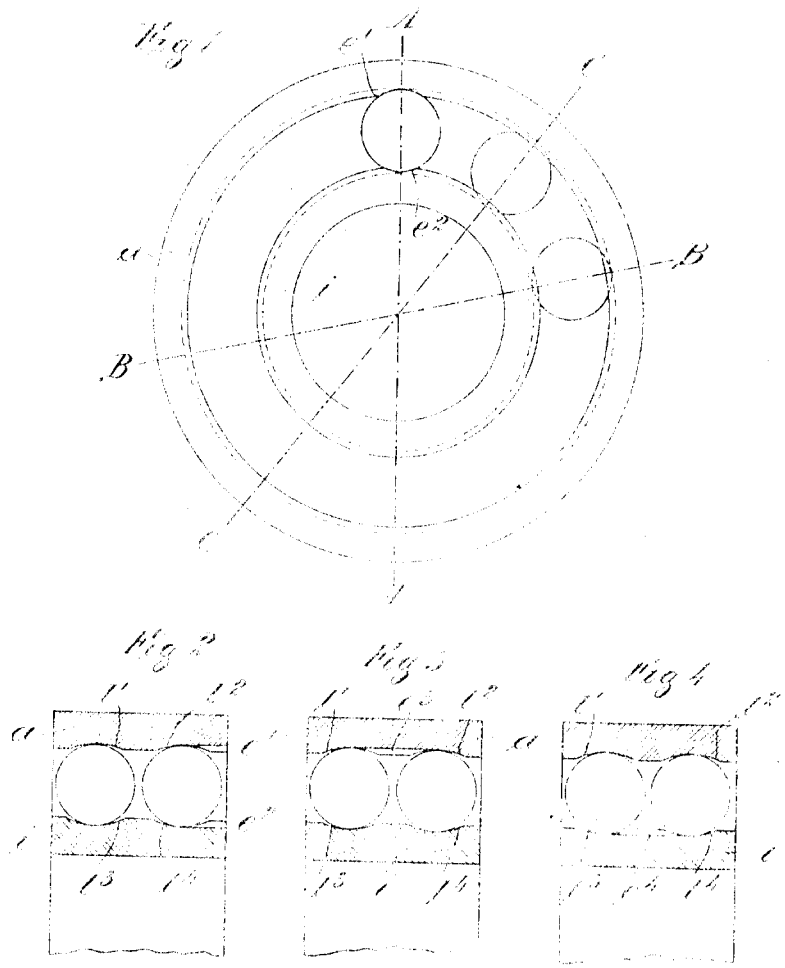
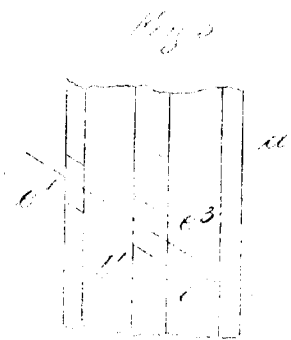

United states patent office.

OSKAR HOFFMANN, OF WILLICH, NEAR CREFELD, GERMANY.

BALL-BEARING WITH SEVERAL ROWS OF BALLS.

1,105,433.　　　　Specification of Letters Patent.　　Patented July 28, 1914.

Application filed May 16, 1914.　Serial No. 838,939.

*To all whom it may concern:*

Be it known that I, OSKAR HOFFMANN, a subject of the Emperor of Germany, and residing at Willich, near Crefeld, Germany, have invented certain new and useful Improvements in Ball-Bearings with Several Rows of Balls, of which the following is a specification.

My invention has reference to a ball-bearing having several rows of balls with openings in the rings for filling in the said balls.

An essential feature of the invention is that the filling-openings of the various rows of balls are displaced relatively to one another in each of the two rings with regard to the periphery of the ring. This can be attained either by having the center lines of the filling-openings of each ring disposed in a radial direction, but not coinciding with one another, or else by having the center lines indeed coinciding with one another, but disposed obliquely instead of radially. The filling-openings are situated on the inner ring or on the outer ring or on both rings together and they are so arranged as to run from the outer edge of the rings toward the first row of balls as also between the individual rows of balls.

The balls are filled in from that side of the bearing on which the outer edge of the rings is provided with the necessary openings. The rings are brought into the most favorable position with regard to one another for filling purposes and the introduction of the balls in the first ball-race is carried out in a known manner. The balls are run into the farther ball-races from the first ball-race in a similar manner after the filling-openings between the ball-races in question have also been brought into the most favorable position for passing the balls through.

The drawings show the subject of my invention, as follows:—

Figure 1 represents a plan-view of a ball-bearing, and Figs. 2, 3 and 4 are sections on the lines A—A, B—B and C—C of Fig. 1. Fig. 5 is a development of the periphery of one of the rings and from it can be seen how the displacement of the filling-openings with regard to one another can be attained by the oblique arrangement of their common center-line.

$a$ is the outer ring, $i$ the inner ring. $l^1$, $l^2$, $l^3$ and $l^4$ are the ball-races. In the example shown in the drawings only two rows of balls are provided.

Fig. 2 shows the filling-openings $e^1$, $e^2$ in the outer and inner rings.

Fig. 3 shows the inner filling-opening $e^3$ in the outer ring, and Fig. 4 shows the inner filling-opening $e^4$ in the inner ring.

From Figs. 2, 3 and 4 can be seen that the filling-openings $e^1$, $e^2$ which are arranged radially do not lie in a straight line with the openings $e^3$, $e^4$, but that they are displaced with regard to each other.

If a ball is lying in front of two oppositely disposed inner filling-openings, then it is nevertheless impossible for the ball to be thrust out, because the ball in the next row is held back by the high edge of the ring on the other side. The lateral distance between the rows of balls can be so dimensioned that a lateral pressure on a ball is immediately transmitted to the neighboring ball of the next row. The balls of the individual rows are held in a known manner by means of holding rings or cages.

Having now described my invention what I claim as new and desire to secure by Letters Patent is:—

1. A ball bearing comprising inner and outer rings having a plurality of ball raceways and provided with lateral slots which when in register form filling openings for inserting the balls from one side of the rings into the first raceway, said rings also having slots connecting said raceway to the adjacent raceway, the latter slots being circumferentially displaced when the first mentioned slots are in register but permitting, when brought into register, the balls to be passed from the first raceway into the adjacent raceway.

2. A ball bearing comprising inner and outer rings having a plurality of ball raceways and provided with lateral slots which when in register form filling openings for inserting the balls from one side of rings into the first raceway, said rings also having slots connecting said raceway to the adjacent raceway, the latter slots permitting the balls to be passed from the first raceway into the adjacent raceway and having a center line coincident with that of the first mentioned slots and extending obliquely across the ring.

In testimony whereof I have signed my name to this specification in the presence of two subscribing witnesses.

OSKAR HOFFMANN. [L. S.]

Witnesses:
   HELEN NUFER,
   FRANCES NUFER.